(12) United States Patent
McCutcheon

(10) Patent No.: US 12,733,712 B2
(45) Date of Patent: Sep. 15, 2026

(54) LATTICE STRUCTURES

(71) Applicant: Peridot Print LLC, Palo Alto, CA (US)

(72) Inventor: James Andrew McCutcheon, Vancouver, WA (US)

(73) Assignee: PERIDOT PRINT LLC, Palo Alto, CA (US)

( * ) Notice: Subject to any disclaimer, the term of this patent is extended or adjusted under 35 U.S.C. 154(b) by 36 days.

(21) Appl. No.: 18/705,550

(22) PCT Filed: Nov. 15, 2021

(86) PCT No.: PCT/US2021/059386
§ 371 (c)(1),
(2) Date: Apr. 27, 2024

(87) PCT Pub. No.: WO2023/086107
PCT Pub. Date: May 19, 2023

(65) Prior Publication Data

US 2025/0000205 A1 Jan. 2, 2025

(51) Int. Cl.
*A43B 13/18* (2006.01)
*B33Y 50/00* (2015.01)
*B33Y 80/00* (2015.01)
*G06T 17/20* (2006.01)

(52) U.S. Cl.
CPC ............ *A43B 13/181* (2013.01); *G06T 17/20* (2013.01); *B33Y 50/00* (2014.12); *B33Y 80/00* (2014.12)

(58) Field of Classification Search
CPC ....... A43B 17/00; A43B 13/181; G06T 17/20; B33Y 50/00; B33Y 80/00; A61F 5/14
USPC .......................................................... 345/418
See application file for complete search history.

(56) References Cited

U.S. PATENT DOCUMENTS 9,062,216 B2 6/2015 Boocock et al.
9,519,104 B1 * 12/2016 Mullen ................ G02B 6/1228
10,299,722 B1 5/2019 Tran et al.
2009/0002428 A1 1/2009 Min
(Continued)

FOREIGN PATENT DOCUMENTS

CN 210184659 U * 3/2020
EA 008822 B1 8/2007
(Continued)

OTHER PUBLICATIONS

Tao W, Leu MC. Design of lattice structure for additive manufacturing. In2016 International Symposium on Flexible Automation (ISFA) Aug. 1, 2016 (pp. 325-332). IEEE.*
(Continued)

*Primary Examiner* — Phu K Nguyen
(74) *Attorney, Agent, or Firm* — Michael Dryja

(57) ABSTRACT

Examples of lattice structures are described herein. In some examples, a lattice structure includes nodes disposed at respective vertices of a quasi-prism model, at respective polygonal face centers of the quasi-prism model, and between the respective vertices and a central axis of the quasi-prism model. In some examples, the lattice structure includes beams connecting the nodes. In some examples, each node disposed between a vertex and the central axis is connected to a node at the vertex and to nodes at three neighboring polygonal face centers with respective beams.

20 Claims, 7 Drawing Sheets

(56) References Cited

U.S. PATENT DOCUMENTS

| | | | | |
|---|---|---|---|---|
| 2013/0300421 | A1* | 11/2013 | Dell'Aversana | G01V 3/15 324/365 |
| 2016/0192741 | A1 | 7/2016 | Mark | |
| 2018/0271211 | A1* | 9/2018 | Perrault | B33Y 50/00 |
| 2019/0223797 | A1* | 7/2019 | Tran | A43B 13/181 |
| 2020/0112053 | A1 | 4/2020 | Mo et al. | |
| 2020/0388489 | A1 | 12/2020 | Pelzel et al. | |
| 2021/0004344 | A1* | 1/2021 | Cohen | G06N 3/045 |
| 2021/0093090 | A1* | 4/2021 | Deevers | A47C 7/029 |
| 2022/0290570 | A1* | 9/2022 | Jenett | B22F 5/04 |
| 2022/0297401 | A1* | 9/2022 | Hartmann | A43B 13/02 |
| 2022/0389316 | A1* | 12/2022 | Yao | C09K 19/00 |
| 2023/0219474 | A1* | 7/2023 | Maloney | B60N 2/7017 297/452.26 |
| 2024/0000182 | A1* | 1/2024 | Weber | A42B 3/124 |
| 2024/0278519 | A1* | 8/2024 | Hartmann | A43B 13/02 |
| 2025/0224076 | A1* | 7/2025 | Tekoglu | F16S 3/08 |

FOREIGN PATENT DOCUMENTS

| | | | |
|---|---|---|---|
| EP | 2008822 | A2 | 12/2008 |
| WO | 2018/115874 | A1 | 6/2018 |

OTHER PUBLICATIONS

Wen et al., "Effect of spin-orbit coupling on the actinide dioxides AnO2 (An=Th, Pa, U, Np, Pu, and Am): A screened hybrid density functional study", J. Chem. Phys. 137, 2012, 154707-1-154707-6.

* cited by examiner

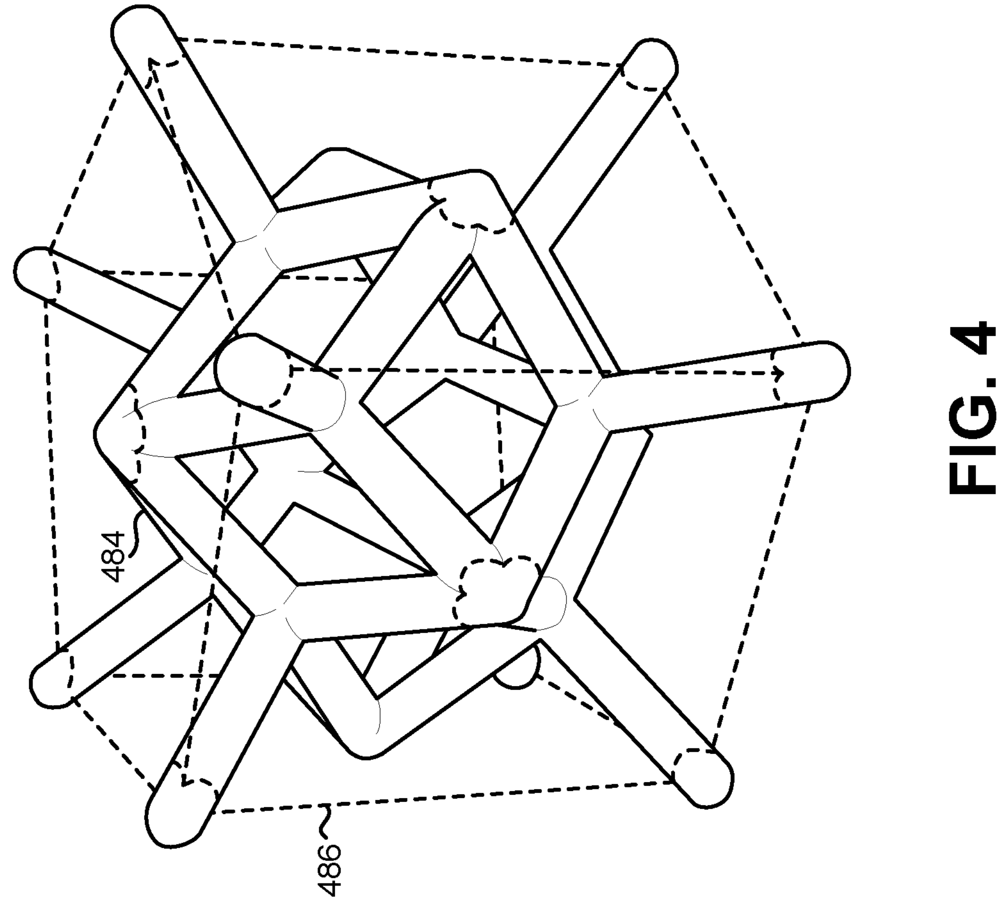
FIG. 4

1003

1207

901

1105

LATTICE STRUCTURES

BACKGROUND

Different materials have different mechanical properties. For example, different foams, plastics, polymers, metals, cloths, etc., exhibit different properties under compression, tension, torsion, flexion, etc. For instance, different materials may deform differently and/or exhibit different tolerances when under a mechanical load. Materials may be utilized to manufacture objects according to the properties of the materials and anticipated use of the objects.

BRIEF DESCRIPTION OF THE DRAWINGS

FIG. 4 is a diagram illustrating a perspective view of an example of a lattice structure;

DETAILED DESCRIPTION

Figure 1:
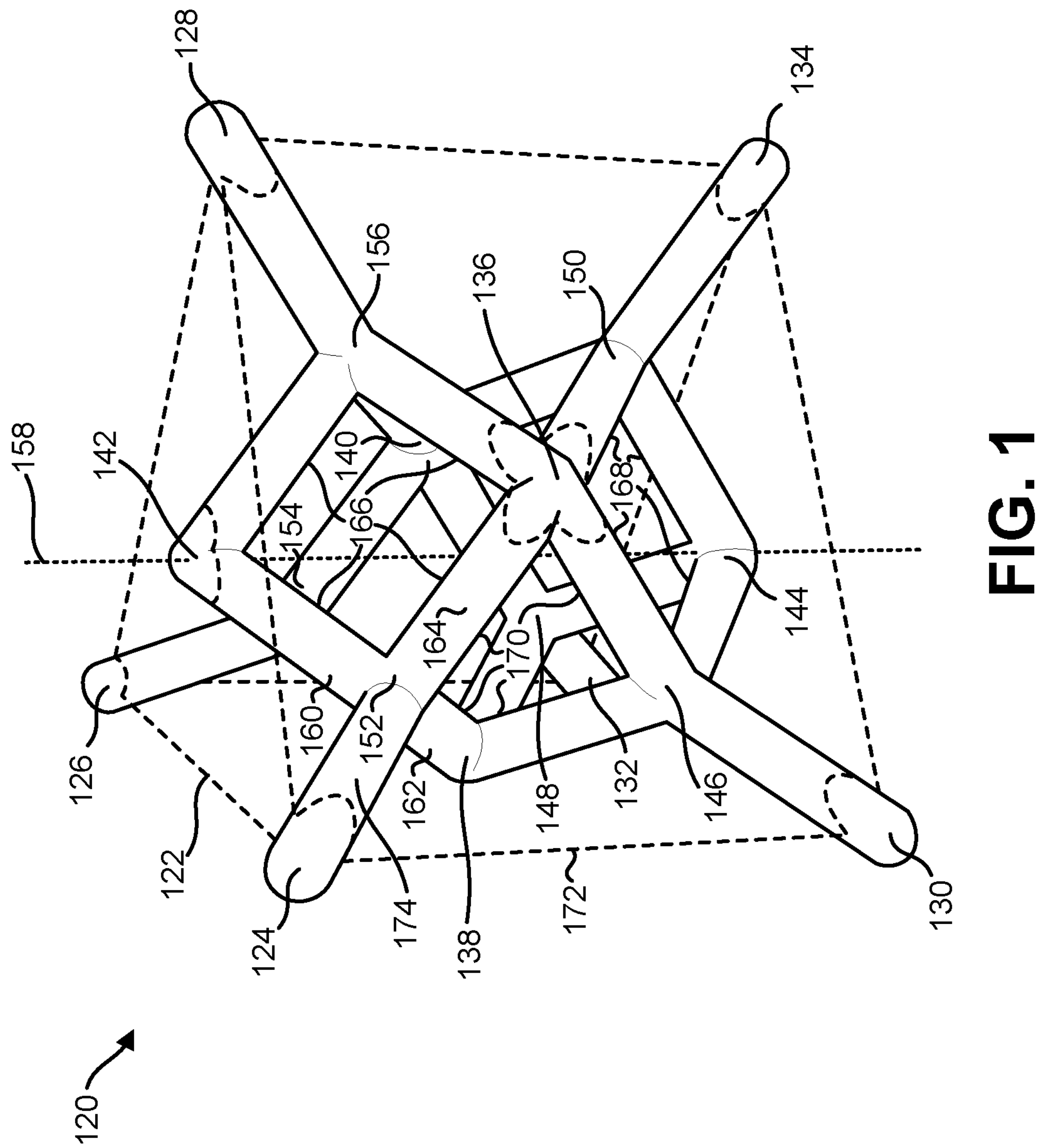
FIG. 1 is a diagram illustrating a perspective view of an example of a lattice structure.

A lattice structure is an arrangement of a member or members (e.g., branches, beams, joists, columns, posts, rods, fins, etc.). For example, a lattice structure may be structured along one dimension, two dimensions, and/or three dimensions. Examples of a lattice structure may include rods, two-dimensional grids, three-dimensional grids, etc. In some examples, a lattice structure includes members disposed in a crosswise manner. For instance, two members of a lattice structure may intersect at a diagonal, perpendicular, or oblique (e.g., non-perpendicular and non-parallel) angle.

In some examples, a lattice structure, flow exchange structure, and/or heat exchanger may be manufactured by three-dimensional (3D) printing. Some examples of 3D printing that may be utilized to manufacture some examples of the structures described herein may include Fused Deposition Modeling (FDM), Multi-Jet Fusion (MJF), Selective Laser Sintering (SLS), binder jet, Stereolithography (SLA), Selective Laser Melting (SLM), Electron Beam Melting (EBM), Metal Jet Fusion, metal binding printing, liquid resin-based printing, etc.

In some examples, additive manufacturing may be used to manufacture 3D objects (e.g., geometries, lattices, etc.). Some examples of additive manufacturing may be achieved with 3D printing. For example, thermal energy may be projected over material in a build area, where a phase change and solidification in the material may occur at certain voxels. A voxel is a representation of a location in a 3D space (e.g., a volumetric component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc. The term "voxel level" and variations thereof may refer to a resolution, scale, or density corresponding to voxel size.

Some examples of the geometries and/or structures (e.g., lattice structures, flow exchange structures, etc.) described herein may be produced by additive manufacturing. For instance, some examples may be manufactured with plastics, polymers, semi-crystalline materials, metals, etc. Some additive manufacturing techniques may be powder-based and driven by powder fusion. Some examples of the geometries and/or structures (e.g., lattices) described herein may be manufactured with area-based powder bed fusion-based additive manufacturing, such as MJF, Metal Jet Fusion, metal binding printing, SLM, SLS, etc. Some examples of the approaches described herein may be applied to additive manufacturing where agents carried by droplets are utilized for voxel-level thermal modulation.

In some examples of additive manufacturing, thermal energy may be utilized to fuse material (e.g., particles, powder, etc.) to form an object (e.g., structure, geometry, lattice, etc.). For example, agents (e.g., fusing agent, detailing agent, etc.) may be selectively deposited to control voxel-level energy deposition, which may trigger a phase change and/or solidification for selected voxels.

In some examples of 3D printing, a binding agent (e.g., adhesive) may be printed onto material in a build volume to bind powder (e.g., particles) to form a precursor object (e.g., "green part"). The precursor object may be heated (in an oven or heating apparatus, for example) to sinter the precursor object and form a solid object.

Some examples of lattice structures (e.g., 3D printed lattice structures) may provide favorable mechanical properties that may be applied in a variety of industries. For instance, lattice structures may be utilized instead of foams in some mechanisms and/or devices. The mechanical response of lattice structures may be tunable in some examples, which may provide responses that are unavailable with some foams. For instance, lattice structures may provide advancements in performance footwear.

Some examples of lattice structures include cells. A cell is a mechanical unit or structure. In some examples, cells may be arranged in a repetitive pattern to form a lattice structure. In some examples, cells may be arranged in random patterns (e.g., different cell volumes) to form a lattice structure. Cells may be arranged to inform the overall performance of the lattice structure.

Some approaches to building lattices may include shaping cells to comply with complex boundaries. For example, cells may be truncated and/or warped to comply with a boundary or 3D shape. However, some cells may be limited in their ability to conform to complex boundaries while retaining an aspect ratio of an undeformed cell and/or while maintaining targeted mechanical properties (e.g., reducing mechanical performance differences between the deformed cell and an undeformed cell).

Some examples of the techniques described herein may provide cells that may be utilized to form lattice structures. Some of the techniques described herein may utilize quasi-prism models (e.g., triangular, cuboidal, hexagonal quasi-prism models, etc.) to enhance lattice structure properties. For example, a cell can be structured to conform to a quasi-prism model. A quasi-prism model is a polyhedron including vertices, edges, and faces. For instance, a quasi-prism model may be a polyhedron with two bases (e.g., non-adjacent polygonal faces with n edges) connected by quadrilateral faces. For instance, the two bases may be connected by edges between corresponding vertices of the bases. In some examples, a quasi-prism model may have n quadrilateral faces (e.g., non-base faces) forming a polyhedron with the two bases. In some examples, the bases (e.g., non-adjacent polygonal faces with n edges) may have the same number of edges and no interior reflex angles. Some examples of quasi-prism models include regular prism models. A regular prism model is a prism model having bases that are polygons (e.g., triangles, squares, rectangles, pentagons, hexagons, heptagons, octagons, etc.) having sides of equal lengths. For instance, each edge of a first base may be connected to a corresponding edge of a second base by a parallelogram (e.g., rectangular face) in a regular prism model. In some examples, quasi-prism models may vary from a corresponding regular prism model. For instance, each edge of a quasi-prism model may vary within a range (e.g., ±5%, ±10%, ±15%, ±23%, ±45%, ±50%, ±70%, etc.) from a corresponding regular prism model (with a same quantity of sides). Quasi-prism models may be utilized to fill and/or fit a model (e.g., 3D superstructure model). The quasi-prism models may be utilized to populate the model with cells to form a lattice structure.

Some examples of the techniques described herein may provide cells based on quasi-prism models. In some examples, a node topology may be maintained on the quadrilateral faces of the quasi-prism model. The node topology may facilitate interconnectivity between cells. Some examples of the cells described herein may enhance lattice structure performance along complex boundaries.

Throughout the drawings, similar reference numbers may designate similar or identical elements. When an element is referred to without a reference number, this may refer to the element generally, without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a diagram illustrating a perspective view of an example of a lattice structure 120. In this example, the lattice structure 120 includes nodes 124, 126, 128, 130, 132, 134, 136, 138, 140, 142, 144, 146, 148, 150, 152, 154, 156 and beams (e.g., beams 160, 162, 164, etc.). A node is a geometrical endpoint of a beam (e.g., an endpoint of a line representing a beam or a skeletal beam) or an intersecting point between beams. In some examples, beams may intersect at a diagonal, perpendicular, or oblique (e.g., non-perpendicular and non-parallel) angle. For instance, beams of a lattice structure may intersect at an angle (e.g., 15°, 30°, 45°, 70°, 85°, 95°, 110°, 135°, etc.). In some examples, due to beam thickness, a beam may extend beyond a node or the geometrical endpoint of the beam. For instance, a beam thickness may be a 3D expansion of a geometrical line representing the beam. Some examples of beam thickness may include 1 millimeter (mm), 2 mm, 4 mm, 10 mm, 50 mm, 1 centimeter (cm), etc.

In the example of FIG. 1, the lattice structure 120 includes first nodes 124, 126, 128, 130, 132, 134 disposed at respective vertices of a quasi-prism model 122, second nodes 136, 138, 140, 142, 144 disposed at respective polygonal face centers of the quasi-prism model 122, and third nodes 146, 148, 150, 152, 154, 156 disposed between the respective vertices and a central axis 158 of the quasi-prism model 122. Each of the third nodes 146, 148, 150, 152, 154, 156 may be disposed at a distance between a respective vertex and the central axis 158. For instance, an internal node may be disposed at a proportion (e.g., 25%, 33%, 50%, 75%, etc.) of the distance between a vertex and a central axis 158 (e.g., between a vertex and a centroid) of the quasi-prism model 122. In some examples, a central axis may run through centroids (e.g., 2D polygonal centroids) of the bases of a quasi-prism model and/or may run through a centroid of the quasi-prism model (e.g., 3D centroid). For instance, the central axis 158 runs through centroids of the top and bottom triangular bases of the quasi-prism model 122 of FIG. 1.

In some examples, a lattice structure and/or cell may not include a node at the centroid of a corresponding quasi-prism model and/or may not include an interior node (within the quasi-prism model) on a central axis of the corresponding quasi-prism model. For instance, the lattice structure 120 may not include an interior node on the central axis 158. In some examples, a lattice structure and/or cell may not include an internal node that is not on a plane between a non-base edge (e.g., edge between bases) and a central axis of the quasi-prism model. For instance, the lattice structure 120 may include internal nodes 146, 152 on a plane between the non-base edge 172 and the central axis 158 in some examples.

In the example of FIG. 1, the first nodes 124, 126, 128, 130, 132, 134 correspond to the vertices of the quasi-prism model 122 and may be coincident with the vertices of the quasi-prism model 122 (e.g., the vertices are located within the corresponding illustrated beams). In some examples, the term "peripheral nodes" may refer to nodes (e.g., first nodes 124, 126, 128, 130, 132, 134 and second nodes 136, 138, 140, 142, 144) corresponding to outer vertices and/or faces of a quasi-prism model (e.g., quasi-prism model 122). In some examples, the term "interior nodes" may refer to nodes (e.g., third nodes 146, 148, 150, 152, 154, 156) disposed in an interior of a quasi-prism model (e.g., quasi-prism model 122). In the example of FIG. 1, the quasi-prism model 122 is a regular prism model with triangular bases and three quadrilateral (e.g., rectangular) faces.

In the example of FIG. 1, the lattice structure 120 includes beams connecting nodes 124, 126, 128, 130, 132, 134, 136, 138, 140, 142, 144, 146, 148, 150, 152, 154, 156. For instance, a beam 160 connects a node 142 to a node 152 as shown in FIG. 1. In some examples, each node disposed between a vertex and the central axis 158 (e.g., each of the third nodes 146, 148, 150, 152, 154, 156) is connected to a node at the vertex and to nodes at three neighboring polygonal face centers with respective beams. For instance, a node 152 is connected to a node 124 at a vertex (with a beam 174) and is connected to nodes 136, 138, 142 (with beams 164, 162, 160) at centers of three neighboring polygonal faces (e.g., the front face center, back-left face center, and top face center) of the quasi-prism model 122 of FIG. 1.

In some examples, arrangement of the nodes and beams of the lattice structure 120 of FIG. 1 may provide mechanical support, cushioning, shock absorption, and/or vibration absorption. The node arrangement may allow connecting structures (e.g., connecting cells based on quasi-prism models with a same quantity of faces or a different quantity of faces) by maintaining a node arrangement on the quadrilateral faces of the quasi-prism model 122. The ability to connect different cells may allow better fitting of the lattice structure 120 along a boundary of a 3D superstructure model.

In the example of FIG. 1, the lattice structure 120 includes a first quadrilateral structure 168 and a second quadrilateral structure 166. The first quadrilateral structure 168 is disposed between (e.g., connected between) a first base face (e.g., the bottom face) and a non-base face (e.g., the front face) of the quasi-prism model 122, and the second quadrilateral structure 166 is disposed between the non-base face (e.g., the front face) and a second base face (e.g., the top face) of the quasi-prism model 122. In some examples, the first quadrilateral structure 168 is connected to the second quadrilateral structure 166 (e.g., connected at the node 136 corresponding to the front face of the quasi-prism model 122). The lattice structure 120 may include similar quadrilateral structures for each non-base face of the quasi-prism model 122. Similar quadrilateral structures may be included in some examples of the lattice structures described herein. In some examples, the first quadrilateral structure 168 and/or the second quadrilateral structure 166 may provide mechanical support and/or flexing for mechanical stress (e.g., compression) on the lattice structure 120. In some examples, the first quadrilateral structure 168 and/or the second quadrilateral structure 166 may provide mechanical support without a post (e.g., vertical post) that is directly oriented in the same direction as the central axis 158.

In the example of FIG. 1, the lattice structure 120 includes a quadrilateral structure 170 disposed between (e.g., connected between) neighboring non-base faces of the quasi-prism model 122 (that intersect at an edge 172, for instance). The lattice structure 120 includes similar quadrilateral structures for each edge between bases of the quasi-prism model 122. For instance, the quadrilateral structure 170 may correspond to an edge 172 between bases of the quasi-prism model 122. Similar quadrilateral structures may be included in some examples of the lattice structures described herein. For instance, some examples of the lattice structures described herein may include a quadrilateral structure for each edge between bases of a quasi-prism model. The quadrilateral structures (e.g., representative lines within the quadrilateral structures) may be arranged according to a representative planar quadrilateral or a skew quadrilateral. A planar quadrilateral is a quadrilateral where all edges of the quadrilateral line in the same plane. A skew quadrilateral is a quadrilateral where edges of the quadrilateral do not lie in the same plane. In some examples, the quadrilateral structure 170 may provide mechanical support and/or flexing for mechanical stress (e.g., compression) on the lattice structure 120. In some examples, the quadrilateral structure 170 may provide mechanical support without a post (e.g., vertical post) that is directly oriented in the same direction as the central axis 158.

In some examples, the lattice structure 120 may include a cell or cells. In the example of FIG. 1, one cell (e.g., a first cell) is illustrated. In some examples, the first cell illustrated in FIG. 1 may be connected to another cell or cells. For instance, the first cell that conforms to the quasi-prism model 122 that includes the nodes 124, 126, 128, 130, 132, 134, 136, 138, 140, 142, 144, 146, 148, 150, 152, 154, 156 and the beams illustrated may be connected to a second cell (not shown in FIG. 1) including second nodes and second beams that conform to a second quasi-prism model. In some examples, a first face of the quasi-prism model 122 may overlap with (e.g., may be coincident with) a second face of the second quasi-prism model. For instance, FIG. 1 illustrates an example of the first cell. The first cell may be connected to a second cell. For instance, the second cell may include four nodes at four vertices of a second face of a second quasi-prism model and a node at a center of the second face, which may be connected to (e.g., may be coincident with) corresponding nodes (e.g., nodes 124, 128, 130, 134, 136) of a first face (e.g., the front face) of the quasi-prism model 122. Accordingly, one node 136 at a center of the first face and four nodes 124, 128, 130, 134 at vertices of the first face may be connected to the second cell at the second face in some examples. In some examples, faces (e.g., quadrilateral faces) of different quasi-prism models may have the same or similar dimensions to connect corresponding vertex nodes and central face nodes.

Figure 2:
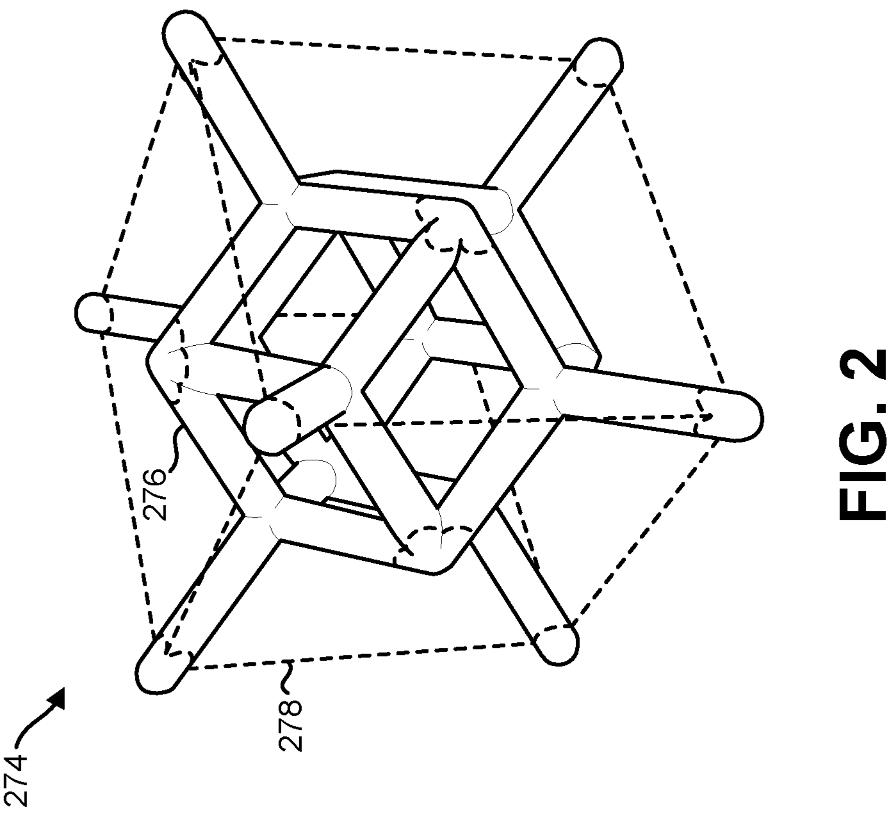
FIG. 2 is a diagram illustrating a perspective view of an example of a lattice structure.

In some examples, the second quasi-prism model may have a same quantity or a different quantity of faces than the quasi-prism model 122. For instance, the quasi-prism model 122 illustrated in FIG. 1 has five faces (e.g., two base faces and three non-base or quadrilateral faces) due to the triangular shape of the bases. The second quasi-prism model (of the second cell, for example) may have five faces (for a quasi-prism model with triangular bases), six faces (for a quasi-prism model with quadrilateral bases), seven faces (for a quasi-prism model with pentagonal bases), eight faces (for a quasi-prism model with hexagonal bases), nine faces (for a quasi-prism model with heptagonal bases), or another quantity of faces. An example of a cell corresponding to a quasi-prism model 278 with quadrilateral bases is illustrated in FIG. 2. An example of a cell corresponding to a quasi-prism model 486 with pentagonal bases is illustrated in FIG. 4. Accordingly, the lattice structure 120 may include cells that conform to quasi-prism models with different quantities of sides, which may allow for different cells in different regions of the lattice structure 120.

In some examples, the first cell may be disposed internally in the lattice structure 120 and the second cell may be disposed at a boundary (e.g., outer edge) of the lattice structure 120 relative to a dimension of the lattice structure 120. For instance, the first cell may be disposed inside of the lattice structure 120 in a two-dimensional (2D) sense and/or in a 3D sense, while the second cell may be disposed at an outer boundary (e.g., exterior) of the lattice structure 120. Because the cells may not be truncated, some examples of the cells described herein may maintain mechanical performance (e.g., similar compression and/or stiffness characteristics) at a boundary of a lattice structure relative to internal cells.

Figures 9, 10, 11, 12:
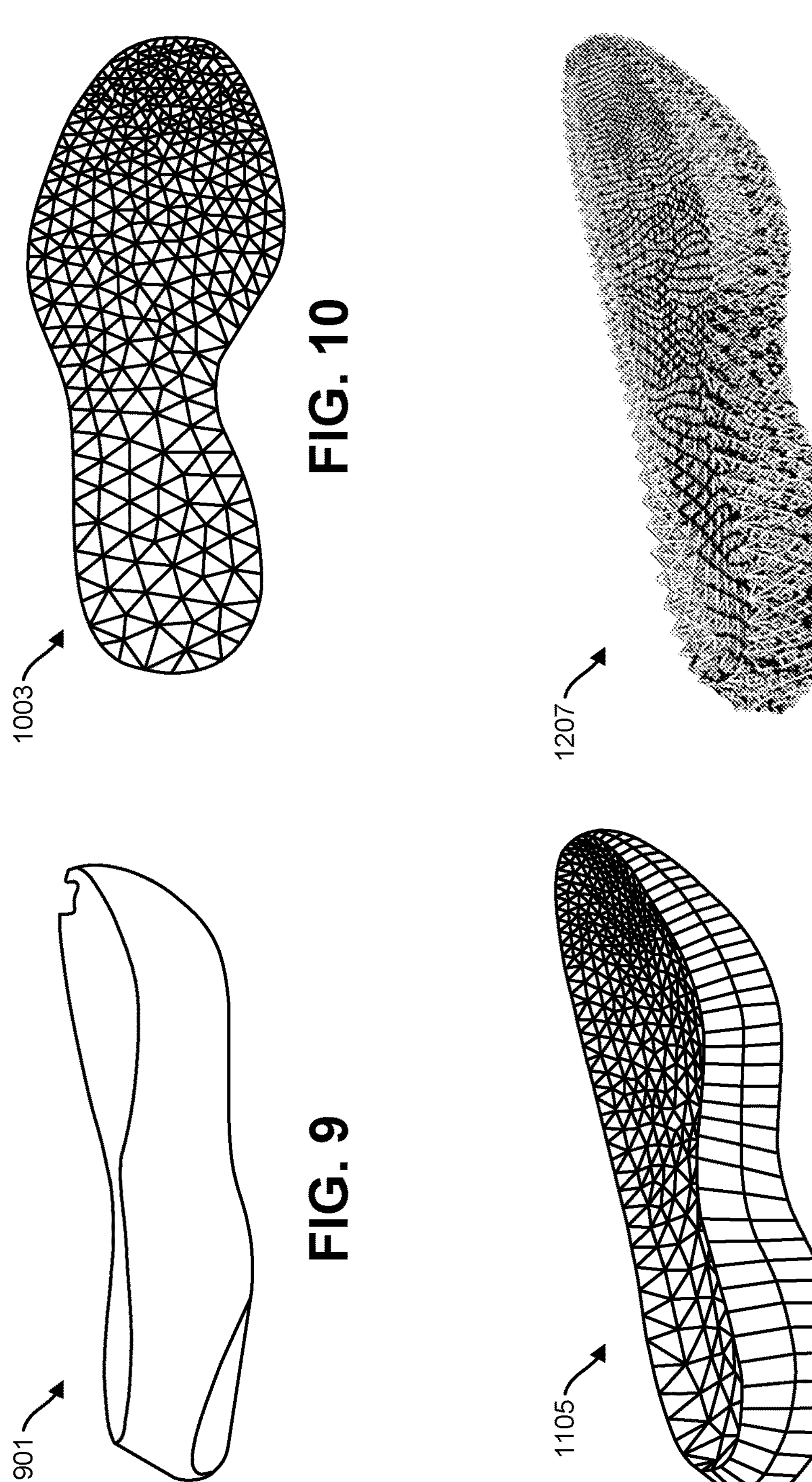
FIG. 9 is a diagram illustrating a perspective view of an example of a superstructure model.
FIG. 10 is a diagram illustrating an example of a two-dimensional representation of the superstructure model described in relation to FIG. 9.
FIG. 11 is a diagram illustrating a perspective view of examples of quasi-prism models conforming to the superstructure model described in relation to FIG. 9.
FIG. 12 is a diagram illustrating a perspective view of an example of a lattice structure in accordance with some of the structures and/or techniques described herein.

In some examples, the lattice structure 120 may be included in a cushioning element. For instance, the lattice structure 120 may be included in a cushioning element to absorb mechanical stress (e.g., compression). In some examples, the cushioning element is at least part of (e.g., included in) an insole or a midsole. For instance, the lattice structure 120 may be included in an insole or a midsole for footwear and/or a shoe. The lattice structure 120 may provide support for a wearer's foot for a variety of activities (e.g., standing, running, jumping, etc.). FIG. 12 illustrates an example of a lattice structure 1207 included in a midsole. In some examples, the lattice structure 120 may be an orthotic, may be included in an orthotic, and/or may be at least part of an orthotic (e.g., insole orthotic, ankle foot orthotic (AFO), other orthotic, etc.).

In accordance with some of the techniques described herein, any regular prism, where a regular prism has two parallel regular polygonal faces with n edges connected by a set of n parallelograms, can be described by n triangular prisms distributed radially around a central axis between the two polygonal bases. For instance, by describing a cuboid regular prism corresponding to a cell, the lattice geometry of the cell may include a repeating set of beams corresponding to each triangular prism sub-volume. In some examples of the techniques described herein, the repeating set of beams may be patterned through other regular prisms (as they are also composed of triangular prisms) to produce a cell structure for any regular prism model with n non-base faces.

FIG. 2 is a diagram illustrating a perspective view of an example of a lattice structure 274. In this example, the lattice structure 274 includes a cell 276 that conforms to a quasi-prism model 278 with rectangular bases. The quasi-prism model 278 may be utilized to determine a disposition for the cell 276 in a superstructure in some examples. A superstructure is a geometrical shape and/or structure. For instance, a superstructure may be a shape and/or structure that is larger in size (in a dimension or dimensions) than a cell. In some examples, the lattice structure 274 described in relation to FIG. 2 may include (or may not include) a feature(s) similar to a feature(s) of the lattice structure 120 described in relation to FIG. 1. For instance, the cell 276 includes nodes disposed at the vertices of the quasi-prism model 278, nodes disposed at the centers of faces of the quasi-prism model 278, and nodes disposed between vertices and a central axis of the quasi-prism model 278 as similarly described in relation to FIG. 1. The cell 276 also includes two quadrilateral structures for each non-base face and a quadrilateral structure for each edge between bases as similarly described in relation to FIG. 1.

In some examples, the cell 276 described in relation to FIG. 2 may be connected to the cell described in relation to FIG. 1. For example, nodes corresponding to one of the rectangular faces of the quasi-prism model 278 of FIG. 2 may be connected to nodes corresponding to one of the rectangular faces of the quasi-prism model 122 of FIG. 1. In some examples, the lattice structure 120 described in relation to FIG. 1 and the lattice structure 274 described in relation to FIG. 2 may be the same lattice structure including a cell corresponding to the quasi-prism model 122 (e.g., triangular quasi-prism model) and a cell 276 corresponding to the quasi-prism model 278 (e.g., rectangular quasi-prism model) of FIG. 2. In some examples, the lattice structure 274 may be included in a cushioning element (e.g., insole or midsole).

Figure 3:
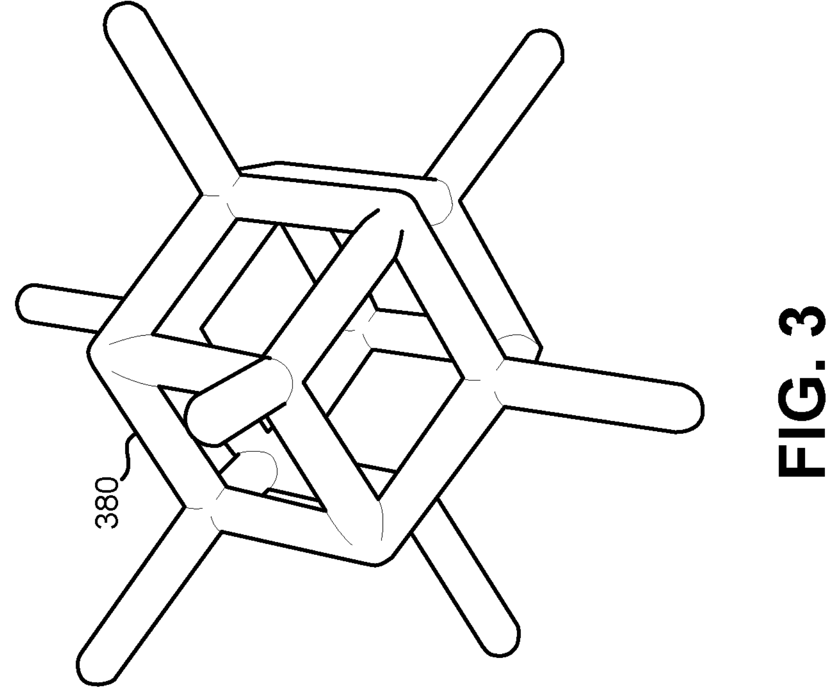
FIG. 3 is a diagram illustrating a perspective view of an example of a cell.

FIG. 3 is a diagram illustrating a perspective view of an example of a cell 380. The cell 380 illustrated in FIG. 3 shows a view of the cell 276 of FIG. 2 without a quasi-prism model.

FIG. 4 is a diagram illustrating a perspective view of an example of a lattice structure 482. In this example, the lattice structure 482 includes a cell 484 that conforms to a quasi-prism model 486 with pentagonal bases. The quasi-prism model 486 may be utilized to determine a disposition for the cell 484 in a superstructure in some examples. The lattice structure 482 described in relation to FIG. 4 may include (or may not include) a feature(s) similar to a feature(s) of the lattice structure 120 described in relation to FIG. 1. For instance, the cell 484 includes nodes disposed at the vertices of the quasi-prism model 486, nodes disposed at the centers of faces of the quasi-prism model 486, and nodes disposed between vertices and a central axis of the quasi-prism model 486 as similarly described in relation to FIG. 1. The cell 484 also includes two quadrilateral structures for each non-base face and a quadrilateral structure for each edge between bases as similarly described in relation to FIG. 1.

In some examples, the cell 484 described in relation to FIG. 4 may be connected to the cell described in relation to FIG. 1 and/or to the cell 276 described in relation to FIG. 2. For example, nodes corresponding to one of the rectangular faces of the quasi-prism model 486 of FIG. 4 may be connected to nodes corresponding to one of the rectangular faces of the quasi-prism model 122 of FIG. 1 and/or may be connected to nodes corresponding to one of the rectangular faces of the quasi-prism model 278 of FIG. 2. In some examples, the lattice structure 120 described in relation to FIG. 1, the lattice structure 274 described in relation to FIG. 2, and/or the lattice structure 482 described in relation to FIG. 4 may be the same lattice structure including a cell corresponding to the quasi-prism model 122 (e.g., triangular quasi-prism model), a cell 276 corresponding to the quasi-prism model 278 (e.g., rectangular quasi-prism model) of FIG. 2, and/or a cell 484 corresponding to the quasi-prism model 486 (e.g., pentagonal quasi-prism model) of FIG. 4. In some examples, the lattice structure 482 may be included in a cushioning element (e.g., insole or midsole).

Figure 5:
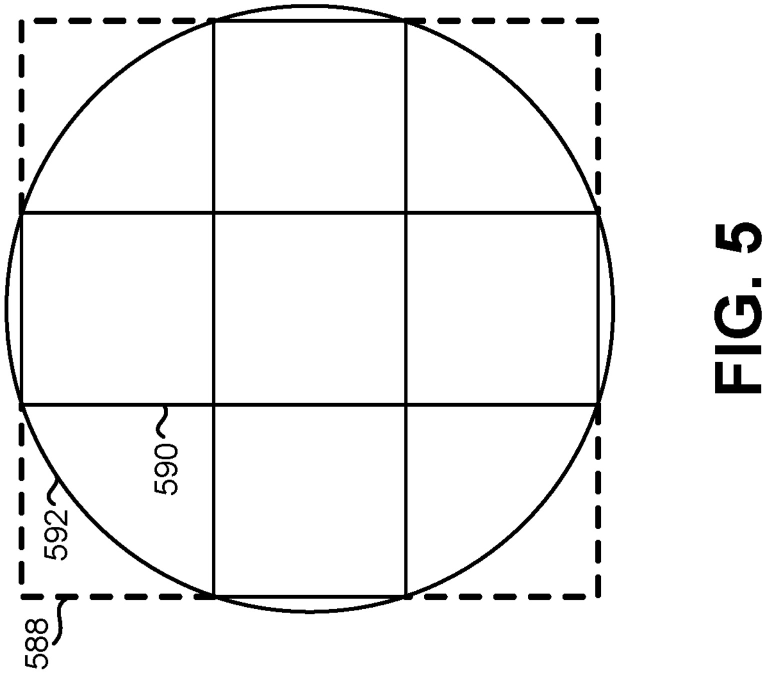
FIG. 5 is a diagram illustrating an example of a curved superstructure boundary and a framing geometry.

FIG. 5 is a diagram illustrating an example of a curved superstructure boundary 592 and a framing geometry 590. In this example, cells of a lattice structure may correspond to the framing geometry 590 with a cubic shape. As illustrated in FIG. 5, the cubic shapes of the framing geometry 590 fail to closely approximate the curved superstructure boundary 592. In some approaches, portions of cells corresponding to portions 588 of the framing structure may be trimmed to the curved superstructure boundary 592 (e.g., cut off to avoid extending beyond the boundary using a cutting tool, punching mechanism, etc.). Trimming the cells to the curved superstructure boundary 592 may compromise the mechanical performance of the lattice structure. For instance, trimming a cell may sever a beam(s), disconnect node(s), etc., which may alter mechanical performance (e.g., support, stiffness, firmness, strength, and/or durability, etc.) of the lattice structure.

Figure 6:
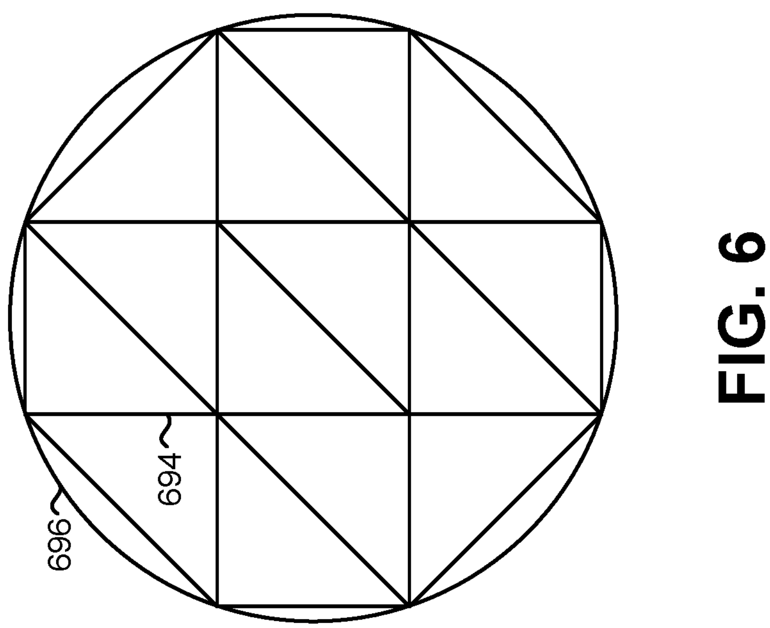
FIG. 6 is a diagram illustrating an example of a curved superstructure boundary and a framing geometry.

FIG. 6 is a diagram illustrating an example of a curved superstructure boundary 696 and a framing geometry 694. In this example, cells of a lattice structure may correspond to the framing geometry 694 with a triangular shape. As illustrated in FIG. 6, the triangular shapes of the framing geometry 694 more closely approximate the curved superstructure boundary 696 (than the cubic shapes of the framing geometry 590 in FIG. 5, for instance). For instance, the sides of the framing geometry 694 may conform to the curved superstructure boundary 696 within a distance range and/or an angular range. In the example of FIG. 6, the cells corresponding to the framing geometry 694 may not be trimmed. In some examples, the framing geometry 694 may correspond to triangular bases of some examples of quasi-prism models described herein.

As illustrated in FIG. 6, some examples of the techniques described herein may provide flexibility to utilize lattice structures that better approximate the shape (e.g., curved boundaries, irregular boundaries, etc.) of superstructures while maintaining mechanical performance at a boundary. For instance, different framing geometries that allow different models, like triangular quasi-prism models, may be utilized to fit to complex shapes as illustrated by the example of FIG. 6.

Figure 7:
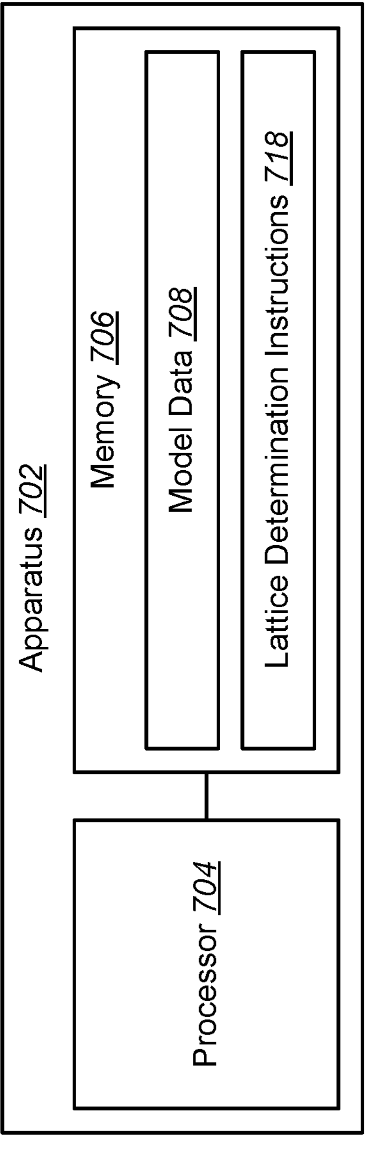
FIG. 7 is a block diagram of an example of an apparatus that may be used to determine a lattice structure or structures described herein.

FIG. 7 is a block diagram of an example of an apparatus 702 that may be used to determine a lattice structure or structures described herein. The apparatus 702 may be a computing device, such as a personal computer, a server computer, a printer, a 3D printer, a smartphone, a tablet computer, etc. The apparatus 702 may include and/or may be coupled to a processor 704 and/or to a memory 706. The processor 704 may be in electronic communication with the memory 706. In some examples, the apparatus 702 may be in communication with (e.g., coupled to, have a communication link with) a manufacturing device (e.g., a 3D printing device). In some examples, the apparatus 702 may be an example of a 3D printing device. The apparatus 702 may include additional components (not shown) and/or some of the components described herein may be removed and/or modified without departing from the scope of this disclosure.

The processor 704 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 706. The processor 704 may fetch, decode, and/or execute instructions (e.g., lattice determination instructions 718) stored in the memory 706. In some examples, the processor 704 may include an electronic circuit or circuits that include electronic components for performing a functionality or functionalities of the instructions (e.g., lattice determination instructions 718). In some examples, the processor 704 may be utilized to determine and/or manufacture one, some, or all of the structures described in relation to one, some, or all of FIGS. 1, 2, 3, 4, 6, 7, 8, 9, 10, 11, and/or 12.

The memory 706 may be any electronic, magnetic, optical, or other physical storage device that contains or stores electronic information (e.g., instructions and/or data). The memory 706 may be, for example, Random Access Memory (RAM), Electrically Erasable Programmable Read-Only Memory (EEPROM), a storage device, an optical disc, and the like. In some implementations, the memory 706 may be a non-transitory tangible machine-readable storage medium, where the term "non-transitory" does not encompass transitory propagating signals.

In some examples, the apparatus 702 may also include a data store (not shown) on which the processor 704 may store information. The data store may be volatile and/or non-volatile memory, such as Dynamic Random-Access Memory (DRAM), EEPROM, magnetoresistive random-access memory (MRAM), phase change RAM (PCRAM), memristor, flash memory, and the like. In some examples, the memory 706 may be included in the data store. In some examples, the memory 706 may be separate from the data store. In some approaches, the data store may store similar instructions and/or data as that stored by the memory 706. For example, the data store may be non-volatile memory and the memory 706 may be volatile memory.

In some examples, the apparatus 702 may include a communication interface (not shown) through which the processor 704 may communicate with an external device or devices (not shown), for instance, to receive and/or store information pertaining to an object or objects (e.g., geometry(ies), lattice(s), etc.) to be determined and/or manufactured. The communication interface may include hardware and/or machine-readable instructions to enable the processor 704 to communicate with the external device or devices. The communication interface may enable a wired and/or wireless connection to the external device or devices. In some examples, the communication interface may further include a network interface card and/or may also include hardware and/or machine-readable instructions to enable the processor 704 to communicate with various input and/or output devices. Examples of input devices may include a keyboard, a mouse, a display, another apparatus, electronic device, computing device, etc., through which a user may input instructions into the apparatus 702. In some examples, the apparatus 702 may receive model data 708 from an external device or devices (e.g., 3D scanner, removable storage, network device, etc.).

In some examples, the memory 706 may store model data 708. The model data 708 may be generated by the apparatus 702 and/or received from another device. Some examples of model data 708 include a computer-aided design (CAD) file(s), 3D manufacturing format (3MF) file(s), object shape data, mesh data, geometry data, etc. The model data 708 may indicate the shape of an object or objects. For instance, the model data 708 may indicate the shape of a geometry or geometries (e.g., regular and/or irregular geometries), superstructure model geometry(ies), quasi-prism model(s), and/or lattice structure cell(s), etc. In some examples, the model data 708 may indicate a shape of one, some, or all of the geometries, superstructure models, lattice structures, quasi-prism models, cells, etc., described herein. In some examples, a superstructure model may be a 3D model (e.g., geometrical model, mesh model, voxel model, etc.). A superstructure model may serve as a frame or shell to guide lattice structure determination. For instance, a lattice structure may be determined that conforms to the boundary or boundaries (e.g., contours, outer shape, surface, etc.) of a superstructure model.

In some examples, the processor 704 may execute the lattice determination instructions 718 to fit a plurality of quasi-prism models to a superstructure model having a boundary (e.g., a 3D surface, a curved boundary, an irregular boundary, non-linear boundary, linear boundary, regular boundary, etc.). A set of faces of the quasi-prism models may conform to the boundary. For instance, some vertices of quasi-prism models may intersect with the boundary. In some examples, all of the quasi-prism model vertices along the boundary may intersect with the boundary (without quasi-prism model truncation, for instance). In some examples, the superstructure model may represent a cushioning element (e.g., midsole, insole, tire, cushion, pillow, carpet pad, mat, upholstery, shock absorber, etc.). An example of a superstructure model representing a midsole is given in FIG. 9.

In some examples, fitting a plurality of quasi-prism models to a superstructure model may include populating a 2D representation of the superstructure model with polygons (e.g., 2D polygons, triangles, squares, pentagons, hexagons, heptagons, and/or octagons, etc.). The polygons may be regular polygons or quasi-regular polygons. A quasi-regular polygon may be a polygon with edges that are within a length range (e.g., ±5%, ±10%, ±15%, ±23%, ±45%, ±50%, etc.) from each other and/or a polygon without an interior reflex angle (e.g., without any interior reflex angle or angles). For instance, the processor 704 may determine a 2D representation of the superstructure model. The 2D representation may be a slice, 2D cross section, layer, and/or 2D projection of the superstructure model. For instance, the processor 704 may determine a 2D shape where a boundary or boundaries of the superstructure model intersect with a plane to produce the 2D representation. In some examples, the processor 704 may populate the 2D representation with polygons by mapping polygons over the 2D representation (e.g., fitting polygons within the 2D representation), where vertices (e.g., edges) of some of the polygons are mapped to the outer edge of the 2D representation. Mapping polygon vertices to the outer edge of the 2D representation may produce polygon edges that conform to and/or approximate the outer edge of the 2D representation. In some examples, the polygons may be mapped using a constraint or constraints (e.g., edge size range, quantity of polygon sides, and/or polygon density range, etc.).

In some examples, fitting a plurality of quasi-prism models to a superstructure model may include generating quasi-prism models to conform to the superstructure model based on the polygons (e.g., the polygons mapped to the 2D representation of the superstructure model). For instance, the polygons may serve as bases to generate the quasi-prism models. In some examples, the processor 704 may generate the quasi-prism models by placing, along a third dimension, vertices corresponding to the vertices of the polygons in the 2D representation. For instance, the 2D representation may include polygon vertices in x and y dimensions at a z value (e.g., z plane). The processor 704 may generate vertices at another z value or values corresponding to the vertices of the polygons. For instance, the processor 704 may generate another layer or layers of polygons corresponding to the polygons of the 2D representation. In some examples, the additional vertices may form bases corresponding to the polygons. In some examples, a vertex or vertices of the generated vertices may conform to a surface of the superstructure. For instance, some vertices may be placed on a surface (e.g., top surface and/or bottom surface, etc.) of the superstructure model. The generated vertices may produce the quasi-prism models conforming to the superstructure model. For instance, the additional bases may conform to a top surface and/or bottom surface of the superstructure model. In some examples, the processor 704 may generate multiple layers of bases. For instance, the quasi-prism models may be constrained to be less than a threshold height (e.g., 3 mm, 5 mm, 1 cm, 2 cm, etc.). For example, if a top surface of a superstructure model is larger than the threshold height from the 2D representation, the processor 704 may generate multiple layers to reach the top surface of the superstructure model.

In some examples, the processor 704 may execute the lattice determination instructions 718 to determine a lattice structure including a plurality of cells corresponding to the plurality of quasi-prism models. In some examples, each of the plurality of cells may include nodes disposed at respective vertices of a quasi-prism model, at respective polygonal face centers of the quasi-prism model, and between the respective vertices and a central axis of the quasi-prism model. In some examples, each of the plurality of cells may include beams connecting the nodes, where each node disposed between a vertex and the central axis is connected to a node at the vertex and to nodes at three neighboring polygonal face centers with respective beams.

To determine the lattice structure, for example, the processor 704 may place nodes at each of the vertices of the quasi-prism models and at each face center of each of the plurality of quasi-prism models. In some examples, the processor 704 may place internal nodes at locations between a central axis of a quasi-prism model and vertices of the quasi-prism model for each of the plurality of quasi-prism models. Lines may be placed to connect the nodes. For instance, lines may be placed to connect an internal node to four peripheral nodes (e.g., to a nearest vertex node and to nodes at the centers of three adjacent faces that share the vertex node) for some or all internal nodes. The processor 704 may generate beams along the lines. For instance, a beam with a thickness (e.g., radius or dimensions of 1 mm, 2 mm, 5 mm, and/or 1 cm, etc.) may be formed around each line. For instance, a volume may be formed outward from each line and/or line endpoint. A beam may have a circular shape (e.g., circular cross section and/or circular cylindrical shape), a rectangular shape (e.g., rectangular cross section and/or rectangular prismatic shape), elliptical shape (e.g., elliptical cross section and/or elliptical cylindrical shape), or other shape. In some examples, the beams may have uniform shapes or different shapes. In some examples, placing nodes, connecting the nodes, and/or generating the beams may produce the lattice structure.

In some examples, the lattice structure may include a plurality of cells being structured according to the plurality of quasi-prism models. Boundary quasi-prism models (e.g., quasi-prism models along a boundary or surface of the superstructure) may be fitted to a superstructure boundary. A cell or cells of the plurality of cells may be structured as described above. For instance, a first cell of the plurality of cells may include a peripheral node at each vertex of a first quasi-prism model and at each face center of the first quasi-prism model. In some examples, peripheral beams that are connected to the peripheral nodes at the vertices of the first quasi-prism model are angled to a centroid of the first quasi-prism model without a node at a centroid of the first quasi-prism model. In some examples, the first quasi-prism model includes a regular triangle base or quasi-regular triangle base.

In some examples, the processor 704 may write the lattice structure to a file in the memory 706. For instance, the lattice structure may be stored as a file (e.g., 3MF file, CAD file, voxels, mesh model, etc.) in the model data 708.

In some examples, the processor 704 may execute printing instructions (not shown in FIG. 7) to control a printhead to print the lattice structure. For instance, the processor 704 may control a printhead and/or may send instructions to a 3D printer to print the lattice structure.

Figure 8:
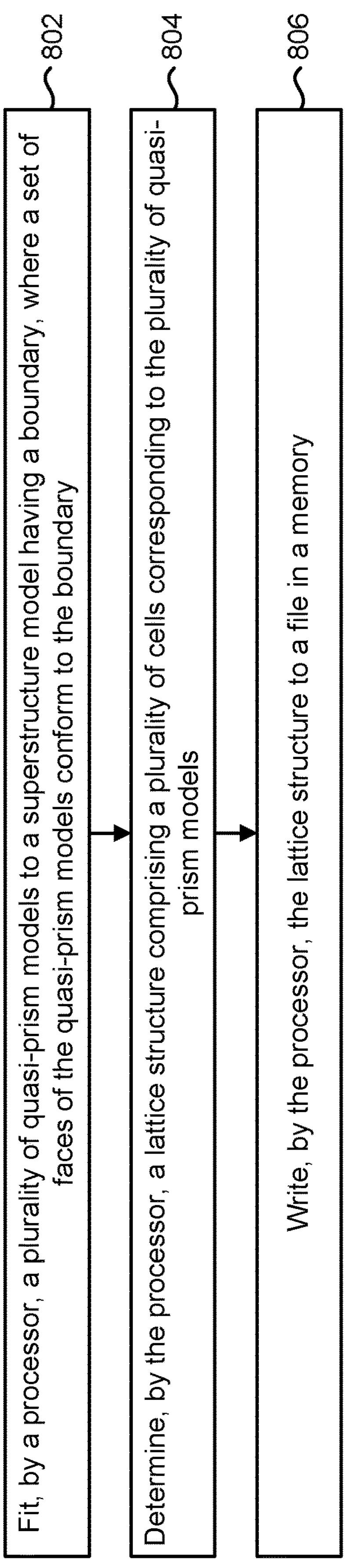
FIG. 8 is a flow diagram illustrating an example of a method for determining a lattice structure.

FIG. 8 is a flow diagram illustrating an example of a method 800 for determining a lattice structure. The method 800 and/or an element or elements of the method 800 may be performed by an apparatus (e.g., electronic device). For example, the method 800 may be performed by the apparatus 702 described in relation to FIG. 7.

The apparatus may fit 802, by a processor, a plurality of quasi-prism models to a superstructure model having a boundary (e.g., curved boundary, irregular boundary, straight boundary, surface, etc.), where a set of faces of the quasi-prism models conform to the boundary. In some examples, the apparatus may fit the plurality of quasi-prism models as described in relation to FIG. 7. Examples of fitting quasi-prism models are given in relation to FIGS. 9, 10, and 11.

The apparatus may determine 804, by the processor, a lattice structure comprising a plurality of cells corresponding to the plurality of quasi-prism models. In some examples, the apparatus may determine the lattice structure as described in relation to FIG. 7. An example determining a lattice structure is given in relation to FIG. 12.

The apparatus may write 806, by the processor, the lattice structure to a file in a memory. In some examples, the apparatus may write the lattice structure to a file as described in relation to FIG. 7. In some examples, the apparatus may print the lattice structure (e.g., control a printhead(s) to print the lattice structure and/or send instructions to a 3D printer to print the lattice structure).

Some examples of the structures and techniques described herein may provide lattice structures that are conformable to complex 3D geometries, while retaining the same nodal connectivity. Some examples of the lattice structure cells described herein may maintain similar loading and unloading behavior along a boundary of the lattice structure as in an internal region of the lattice structure. Some examples of the cells described herein may utilize a similar or same node distribution on quadrilateral faces of the quasi-prism models. The similar or same node distribution may allow for multiple different cells (based on quasi-prism models with different quantities of faces) to be used in a lattice structure, as the cells may retain node-to-node connectivity between mated quadrilateral faces.

FIGS. 9-12 illustrate examples of determining a lattice structure in accordance with some examples of the techniques and structures described herein. FIG. 9 is a diagram illustrating a perspective view of an example of a superstructure model 901. In this example, the superstructure model 901 represents a midsole for footwear. The superstructure model 901 may be utilized to provide a frame and/or bounding geometry to determine a lattice structure.

FIG. 10 is a diagram illustrating an example of a 2D representation 1003 of the superstructure model 901 described in relation to FIG. 9. For instance, the 2D representation 1003 may be populated with polygons (e.g., triangles or other polygons) as described in relation to FIG. 7. For instance, the 2D representation 1003 may be a slice, 2D cross section, layer, bottom, and/or 2D projection of the superstructure model 901. Polygons may be mapped over the 2D representation 1003.

FIG. 11 is a diagram illustrating a perspective view of examples of quasi-prism models 1105 conforming to the superstructure model 901 described in relation to FIG. 9. For instance, the polygons populated in the 2D representation 1003 may be utilized to generate quasi-prism models 1105 to conform to the superstructure model 901 (e.g., to the complex boundary of the superstructure model 901). For example, the quasi-prism models 1105 (e.g., triangular quasi-prism models) may be generated as described in relation to FIG. 7. In some examples, the quasi-prism models 1105 may conform to the boundary of the superstructure model 901 while maintaining the topology of the polygons mapped to the 2D representation 1003.

FIG. 12 is a diagram illustrating a perspective view of an example of a lattice structure 1207 in accordance with some of the structures and/or techniques described herein. For instance, nodes (e.g., peripheral nodes and interior nodes) may be placed based on the quasi-prism models 1105 as described in relation to FIG. 7. In some examples, the nodes may be connected with beams as described in relation to FIG. 7. The nodes and beams may form the lattice structure 1207. The cells of the lattice structure 1207 may conform to the superstructure model 901 (without trimming cells, for instance). In some examples, the procedures described in FIGS. 9, 10, 11, and 12 may be performed to fit a plurality of quasi-prism models to a superstructure model and determine a lattice structure corresponding to the quasi-prism models.

As used herein, the term "and/or" may mean an item or items. For example, the phrase "A, B, and/or C" may mean any of: A (without B and C), B (without A and C), C (without A and B), A and B (but not C), B and C (but not A), A and C (but not B), or all of A, B, and C.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. An additively manufactured object comprising:
- a lattice structure comprising a plurality of cells, including a plurality of first cells that are each an instance of a first quasi-prism model,
- wherein the first quasi-prism model comprises:
  - a plurality of first polygonal faces;
  - a plurality of first facial nodes on the first polygonal faces;
  - a plurality of first vertices;
  - a plurality of first vertex nodes at the first vertices;
  - a plurality of first internal nodes equal in number to the first vertex nodes; and
  - a plurality of first beams that each interconnect a pair of one of the first internal nodes and either one of the first facial nodes or one of the first vertex nodes.

2. The additively manufactured object of claim 1, wherein neighboring first cells share a common first polygonal face, a common first facial node on the common first polygonal face, and common first vertex nodes at corners of the common first polygonal face.

3. The additively manufactured object of claim 1, wherein the first quasi-prism model is a triangular quasi-prism model, such that there are five of the first polygonal faces in number, five of the first facial nodes in number, six of the first vertices in number, six of the first vertex nodes in number, and six of the first internal nodes in number.

4. The additively manufactured object of claim 1, wherein the plurality of cells further include a plurality of second cells that are each an instance of a second quasi-prism model,
- and wherein the second quasi-prism model comprises:
  - a plurality of second polygonal faces different in number than the first polygonal faces of the first quasi-prism model;
  - a plurality of second facial nodes on the second polygonal faces;
  - a plurality of second vertices;
  - a plurality of second vertex nodes at the second vertices;
  - a plurality of second internal nodes equal in number to the second vertex nodes; and
  - a plurality of second beams that each interconnect a pair of one of the second internal nodes and either one of the second facial nodes or one of the second vertex nodes.

5. The additively manufactured object of claim 4, wherein neighboring second cells share a common second polygonal face, a common second facial node on the common second polygonal face, and common second vertex nodes at corners of the common second polygonal face.

6. The additively manufactured object of claim 4, wherein a neighboring pair of one of the first cells and one of the second cells share a common polygonal face, a common facial node on the common polygonal face, and common vertex nodes at corners of the common polygonal face.

7. The additively manufactured object of claim 4, wherein each of the first and second quasi-prism models is selected from a group of quasi-prism models comprising:
- a triangular quasi-prism model having five polygonal faces, five facial nodes, six vertices, six vertex nodes, and six internal nodes; and
- a cuboid quasi-prism model having six polygonal faces, six facial nodes, eight vertices, eight vertex nodes, and eight internal nodes.

8. The additively manufactured object of claim 1, further comprising a cushioning element including the lattice structure.

9. The additively manufactured object of claim 8, further comprising a footwear insole or midsole including the cushioning element.

10. The additively manufactured object of claim 1, wherein the cells comprise boundary cells that are instances of boundary quasi-prism models and that are fitted to a superstructure boundary of the additively manufactured object.

11. The additively manufactured object of claim 10, wherein the boundary cells are fitted to the superstructure boundary of the additively manufactured object without having to be trimmed, such that boundary-facing polygonal faces of the boundary cells conform to the superstructure boundary.

12. The additively manufactured object of claim 10, wherein the boundary cells comprise at least some of the first cells, such that the first quasi-prism model is one of the boundary quasi-prism models.

13. A method comprising:

fitting, by a processor, a lattice structure comprising a plurality of cells within a superstructure model having a curved boundary, including a plurality of first cells that are each an instance of a first quasi-prism model; and writing, by the processor, the lattice structure to a file in a memory, wherein the first quasi-prism model comprises:

a plurality of first polygonal faces;

a plurality of first facial nodes on the first polygonal faces;

a plurality of first vertices;

a plurality of first vertex nodes at the first vertices;

a plurality of first internal nodes equal in number to the first vertex nodes; and a plurality of first beams that each interconnect a pair of one of the first internal nodes and either one of the first facial nodes or one of the first vertex nodes.

14. The method of claim 13, wherein the plurality of cells further include a plurality of second cells that are each an instance of a second quasi-prism model, and wherein the second quasi-prism model comprises:

a plurality of second polygonal faces different in number than the first polygonal faces of the first quasi-prism model;

a plurality of second facial nodes on the second polygonal faces;

a plurality of second vertices;

a plurality of second vertex nodes at the second vertices;

a plurality of second internal nodes equal in number to the second vertex nodes; and a plurality of second beams that each interconnect a pair of one of the second internal nodes and either one of the second facial nodes or one of the second vertex nodes.

15. The method of claim 14, wherein a neighboring pair of one of the first cells and one of the second cells share a common polygonal face, a common facial node on the common polygonal face, and common vertex nodes at corners of the common polygonal face.

16. The method of claim 13, further comprising additively manufacturing an object in accordance with the superstructure model and including the lattice structure.

17. The method of claim 16, wherein the object comprises a cushioning element including the lattice structure.

18. The method of claim 17, wherein the object comprises a footwear insole or midsole including the cushioning element.

19. The method of claim 13, wherein the cells comprise boundary cells that are instances of boundary quasi-prism models and that are fitted to the curved boundary of the superstructure model.

20. The method of claim 19, wherein the boundary cells are fitted to the curved boundary of the superstructure model without having to be trimmed, such that boundary-facing polygonal faces of the boundary cells conform to the curved boundary of the superstructure model.

* * * * *